US006624394B2

(12) United States Patent
Chasen et al.

(10) Patent No.: US 6,624,394 B2
(45) Date of Patent: Sep. 23, 2003

(54) SYSTEM FOR OBTAINING A UNIFORM AIR TEMPERATURE IN A DISCRETE SPACE

(75) Inventors: James E. Chasen, West Haven, CT (US); James A. Sandor, Trumbull, CT (US)

(73) Assignee: HP Intellectual Corp., Wilmington, DE (US)

(*) Notice: Subject to any disclaimer, the term of this patent is extended or adjusted under 35 U.S.C. 154(b) by 89 days.

(21) Appl. No.: 10/059,068

(22) Filed: Jan. 28, 2002

(65) Prior Publication Data

US 2003/0141292 A1 Jul. 31, 2003

(51) Int. Cl.[7] .............................. H05B 1/02; F24H 3/00
(52) U.S. Cl. ..................... 219/486; 219/477; 236/91 R; 340/825.72; 392/373
(58) Field of Search ................................ 219/486, 485, 219/497, 477, 476, 483; 236/36, 91 R; 340/825.72; 392/365, 360, 373, 375

(56) References Cited

U.S. PATENT DOCUMENTS

| 4,090,062 A | * | 5/1978 | Phillips et al. ............... 219/486 |
| 4,114,682 A | * | 9/1978 | Knud .......................... 165/290 |
| 4,132,355 A | | 1/1979 | Cleary et al. |
| 4,174,517 A | | 11/1979 | Mandel |
| 4,287,939 A | | 9/1981 | Pohl et al. |
| 4,362,270 A | | 12/1982 | Cleary et al. |
| 4,542,283 A | * | 9/1985 | Leverenz .................... 219/483 |
| 4,682,648 A | | 7/1987 | Fried et al. |
| 4,824,012 A | | 4/1989 | Tate |
| 4,969,508 A | | 11/1990 | Tate et al. |
| 5,109,222 A | | 4/1992 | Welty |
| 5,272,477 A | | 12/1993 | Tashima et al. |
| 5,341,988 A | | 8/1994 | Rein et al. |
| 5,361,985 A | | 11/1994 | Rein et al. |
| 5,385,297 A | | 1/1995 | Rein et al. |
| 5,390,206 A | | 2/1995 | Rein et al. |
| 5,554,979 A | | 9/1996 | Kohar et al. |
| 5,566,022 A | | 10/1996 | Segev |
| 5,566,879 A | | 10/1996 | Longtin |
| 5,590,831 A | | 1/1997 | Manson et al. |
| 5,743,101 A | * | 4/1998 | Shida et al. ................... 62/175 |
| 5,743,465 A | | 4/1998 | Jeong |
| 5,815,086 A | | 9/1998 | Ivie |
| 5,839,654 A | | 11/1998 | Weber |
| 5,905,442 A | | 5/1999 | Mosebrook et al. |
| 6,466,737 B1 | * | 10/2002 | Birdsell et al. ............. 392/367 |
| 2003/0012563 A1 | * | 1/2003 | Neugebauer et al. ....... 392/365 |

FOREIGN PATENT DOCUMENTS

| FR | 2779024 | * | 11/1999 |
| JP | 57-67729 | * | 4/1982 |
| JP | 2000-146209 | * | 5/2000 |
| WO | 97/46834 | * | 12/1997 |
| WO | 99/09780 | * | 2/1999 |
| WO | 01/82018 | * | 11/2001 |

\* cited by examiner

*Primary Examiner*—John A. Jeffery
(74) *Attorney, Agent, or Firm*—Barry E. Deutsch

(57) ABSTRACT

A system for supplying air to a discrete space to obtain a desired set point temperature within the space includes a plurality of units for conditioning the air in the space. Each of the units has an independent electric power supply cord for connection to a source of electrical power. One of the units includes a master control and another of said units includes a slave control. The master control includes a user temperature control to establish a desired set point temperature within the discrete space. Each of the units includes its own thermostat for sensing the ambient temperatures in the area of the discrete space immediately adjacent the respective units. Each of the units has its own communication device, which enables the master control on the one unit to simultaneously vary the operation of each of the units in inverse proportion to the sensed ambient temperatures to substantially uniformly condition the temperature of the air in the discrete space.

12 Claims, 3 Drawing Sheets

SYSTEM FOR OBTAINING A UNIFORM AIR TEMPERATURE IN A DISCRETE SPACE

BACKGROUND OF THE INVENTION

1. Field of the Invention

This invention relates to a system for simultaneously operating a plurality of conditioning units such as heaters, cooling apparatus or fans in a discrete space so that a desired set point temperature in the space is obtained substantially uniformly throughout the space. As used herein the term "conditioning units" includes heaters, fan heaters, cooling units, room coolers and fans.

The utilization of portable conditioning units such as space heaters and/or room coolers to heat and/or cool large areas is a conventional practice even though not very efficient. Typically, the heaters and/or cooling units are placed at one end of the room to point the hot or cold air flowing from the heating or cooling units towards the center of the area. This is a very inefficient way to heat or cool a space because the hot or cold air must migrate from one end of the space to the other, which results in uneven temperature balance in the room. If a heating unit is employed, the warmest temperature will be attained nearest to the heater while the remote space will be cooler. Conversely, if a room cooler is employed, the coolest temperature will be attained nearest to the unit while the warmest air temperature will exist at the remote end of the space.

Previous solutions to the foregoing problem involve the use of multiple independent heaters and/or cooling units; however, the foregoing was not practical or convenient for several reasons. Multiple heaters and/or air conditioning units set to maximum power could trip a circuit breaker if plugged into the same circuit. Setting the correct power level for each heating and/or cooling unit is difficult to balance properly and needs to be adjusted periodically as room conditions change. Multiple heaters and/or cooling units must be purchased separately and are difficult to store together when not in use. Maintaining a uniform ambient temperature in a room or space is difficult with multiple independent heater and/or cooling units, as the thermostat for each unit must be independently and continuously adjusted to accommodate changing temperature conditions in the space.

It is objects of the present invention to overcome the prior art impracticalities or inefficiencies by (1) attaining even temperature balance in a large area; (2) automatically adjusting the power and air flow delivered from a heating or cooling unit to prevent a blown circuit; (3) providing intelligence for optimum thermostatic control; and (4) providing heaters and/or cooling units that may be stored as a single assembly when not in use.

SUMMARY OF THE INVENTION

The foregoing objects and other objects of the invention are attained in a system for supplying conditioned air into a discrete space for obtaining a desired set point temperature within the space including a plurality of units for providing conditioned air into the space. Each of the units includes an independent power supply cord for connection to a source of electrical power. One of the units includes a master control and the other of the units includes a slave control. The master control includes a temperature control for enabling a user to establish a desired set point temperature within the discrete space. Each of the units includes a thermostat for sensing ambient temperature in the area of the discrete space immediately adjacent the respective unit. Communication devices associated with each of the units enables the master control on one of the units to simultaneously control the operation of each of the units. A communication device transmits a signal from the slave control to the master control. The signal is indicative of the ambient temperature sensed by the thermostat on the other of the units. The communication device transmits a signal from the thermostat of the one unit to the master control indicative of the ambient temperature sensed by the thermostat on the one unit.

The master control generates an output signal. The communication device receives the output signal and transmits second and third output signals to the one unit and the other unit to simultaneously vary the conditioned air output of each unit in inverse proportion to the sensed ambient temperatures to substantially uniformly attain a desired set point temperature in the discrete space.

DESCRIPTION OF THE PREFERRED EMBODIMENT

Figure 1:
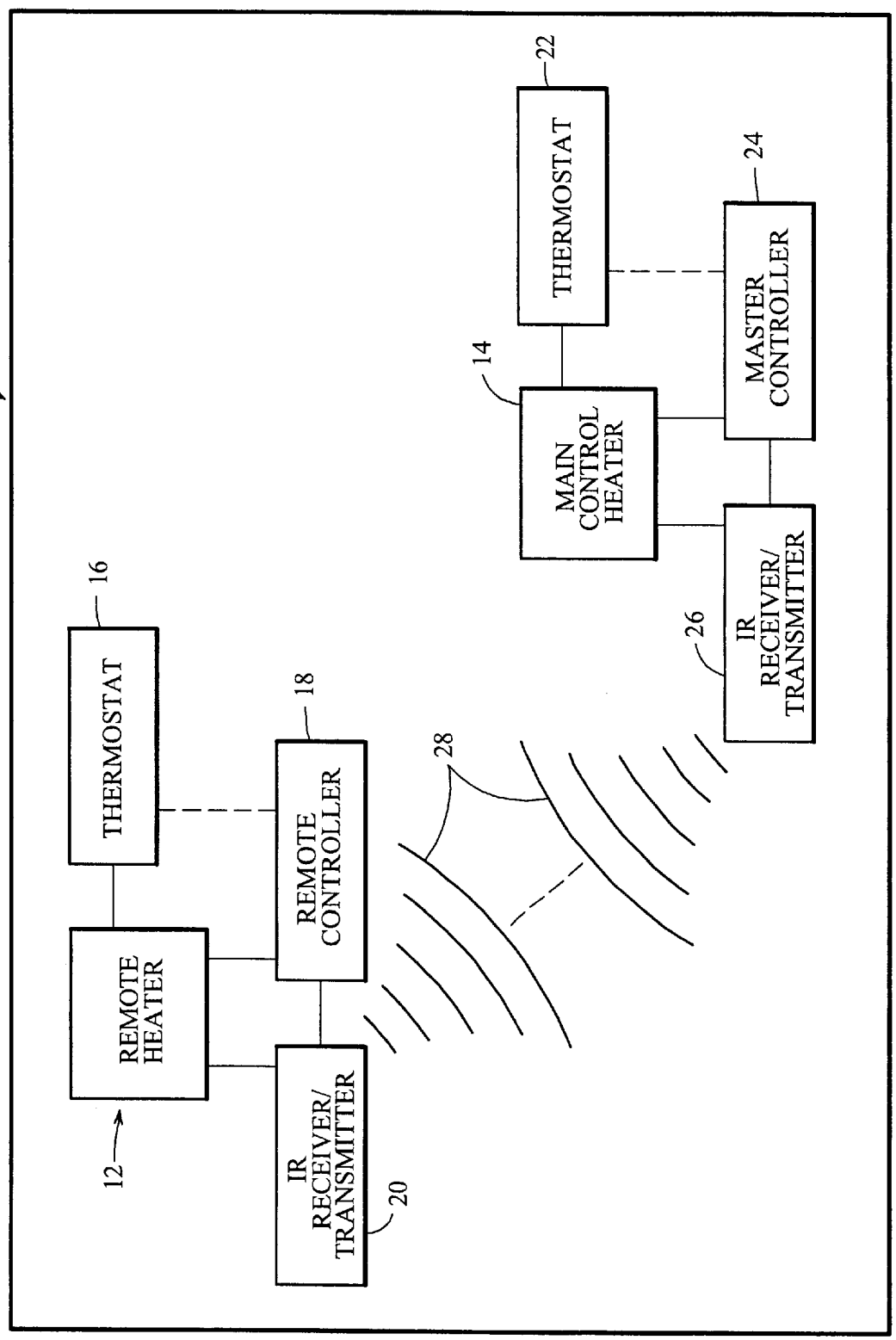
FIG. 1 schematically illustrates a system for providing conditioned air into a discrete space in accordance with the present invention.

Referring now to the various figures of the drawing, a preferred embodiment of the present invention will now be described. In referring to the various figures of the drawings, like numerals shall refer to like parts.

Figure 2:
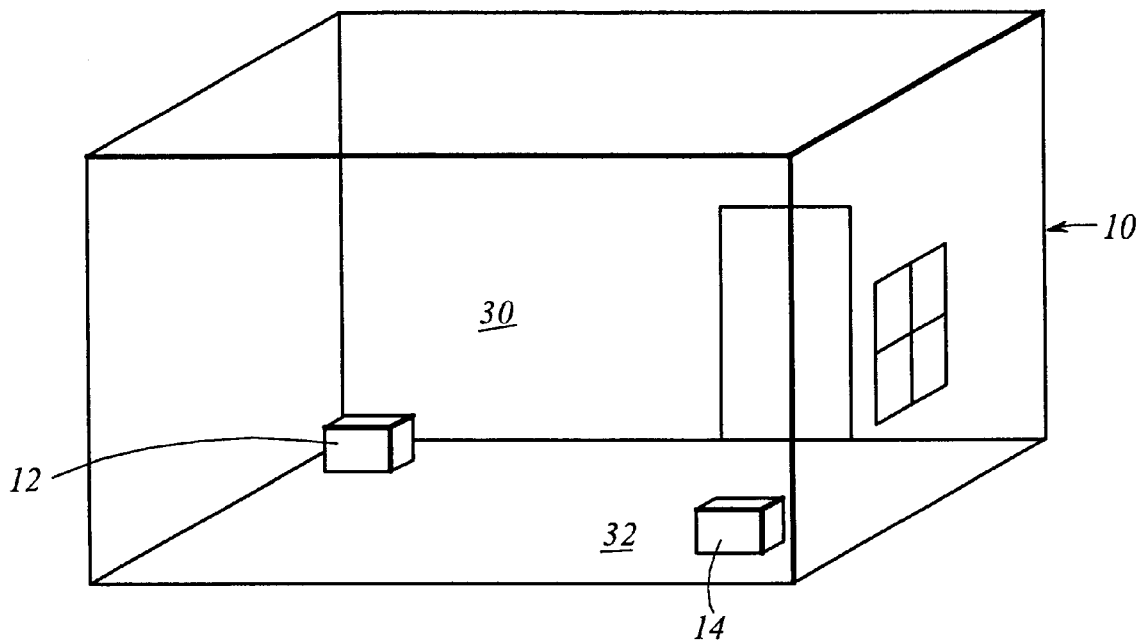
FIG. 2 is a perspective view of a discrete space, with two (2) units mounted in the space, and each of the units operating in accordance with the present invention.

Referring specifically to FIGS. 1 and 2, there is illustrated a discrete space 10 of a relatively large size. Space 10 requires a plurality of units for heating or cooling the air therewithin. As illustrated, space 10 includes two heating units, 12, 14 which are separated and independently operable. Preferably, each of the units is provided at opposed ends of the space. While units 12 and 14 are illustrated as heaters, such units may also comprise other forms of conditioning apparatus, such as room coolers, fans, or the combination of a heating unit or room cooler with a fan.

Unit 14 includes a thermostat 22, a master controller 24, and infrared (IR) receiver/transmitter 26. Thermostat 22 is provided to sense the temperature in the area 32 (shown in FIG. 2) of the discrete space immediately adjacent heater 14. Master controller 24 includes a temperature control for enabling a user to establish a desired set point temperature within the discrete space.

The other of the units, heater 12, includes a thermostat 16, a remote controller 18, and an infrared (IR) receiver/transmitter 20. Thermostat 16 senses the ambient temperature in the area 30 (see FIG. 2) immediately adjacent heater 12.

Each of heaters 12 and 14 includes its own independent electric power supply cord for independent connection to a source of electrical power. As the heaters are located in the same space, it is most likely that the same electrical circuit shall be providing electricity to both heaters. Accordingly, to prevent excessive current draw, the instantaneous total power draw from the combined operation of both units should not exceed 1500 watts at a 120-volt supply.

Remote controller 18 functions as a slave control under the direction of master controller 24. IR receiver/transmitters 20, 26 both transmit and receive infrared control signals 28. Infrared control signals 28 enable the master controller 24 and remote controller 18 to communicate with each other to regulate optimum power and air flow from each heater 12, 14. This achieves the desired set point temperature in space 10.

In operation, let us assume the user wants to regulate temperature in a room or space to obtain 70° F. room temperature. Let us further assume that one end of the room is adjacent a cold, drafty door and the other end of the room is adjacent a window through which the sun is shining. At the start, the end of the space adjacent the door is relatively cold, for example, 55° F. The window end of the space is much warmer, for example, 65° F. The user would set the temperature control of master controller 24 to the desired set point temperature for space 10, for example, 70° F. Heater 14, as it is near the door, will start at nearly full power since the temperature in the area adjacent the heater is relatively cold. Heater 12 is positioned adjacent a relatively warm window and will start operating at a relatively lower power setting. As the temperatures of the two locations start to equalize, thermostats 16 and 22 sense the change in temperature immediately adjacent the respective heaters 12, 14 so that the power level of each unit is adjusted so that both heaters may operate essentially at the same power level. Alternatively, the unit 14 closest to the door may continuously operate at a higher power level than unit 12. However, since units 12, 14 are continuously communicating with each other, the combined power levels of the units will never exceed 1500 watts at 120 volts. The foregoing will enable both units to be connected to the same electrical circuit without tripping a circuit breaker. As conditions in space 10 further change, thermostats 16, 22 monitor the changes immediately adjacent the respective units and thereby substantially uniformly heat space 10.

Again, assume that heater 14 having master controller 24 is adjacent the relatively cold door end of space 10, thermostat 22 will transmit a signal to master controller 24 indicative of the temperature immediately adjacent heater 14. Likewise, remote controller 18 will receive a signal from thermostat 16 and transmit a signal to master controller 24. This signal will be indicative of the sensed ambient temperature immediately adjacent to heater 12.

IR receiver/transmitter 20 generates a control signal in accordance with the magnitude of the sensed ambient temperature and transmits the signal to IR receiver/transmitter 26. This signal in turn is transmitted to master controller 24.

The master controller 24 receives the two signals indicative of the sensed ambient temperatures adjacent heaters 12, 14 and generates first and second control signals which are transmitted to IR receiver/transmitter 26. The two signals are transmitted respectively to heater 12 via IR receiver/transmitter 20 and to heater 14. The magnitude of the signals is in inverse proportion to the sensed ambient temperatures adjacent the respective heaters 12, 14. The heater adjacent the immediate space having the relatively lower temperature will operate at a higher power level and the heater adjacent the space having a relatively warmer temperature will operate at a lower power level. Thus, the entire space 10 will be heated uniformly. When the sensed ambient temperatures adjacent heaters 12, 14 are substantially identical, the two heaters will then be operating at substantially the same power level.

Figure 3:
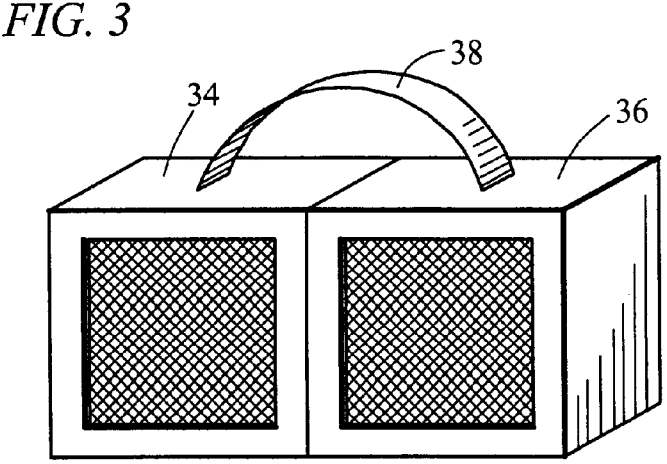
FIG. 3 is a perspective view of a pair of heaters connected together for storage.

FIG. 3 illustrates two heaters 34, 36 which are held together by a handle 38. The two heaters are held together for storage and transportation purposes.

Figure 4:
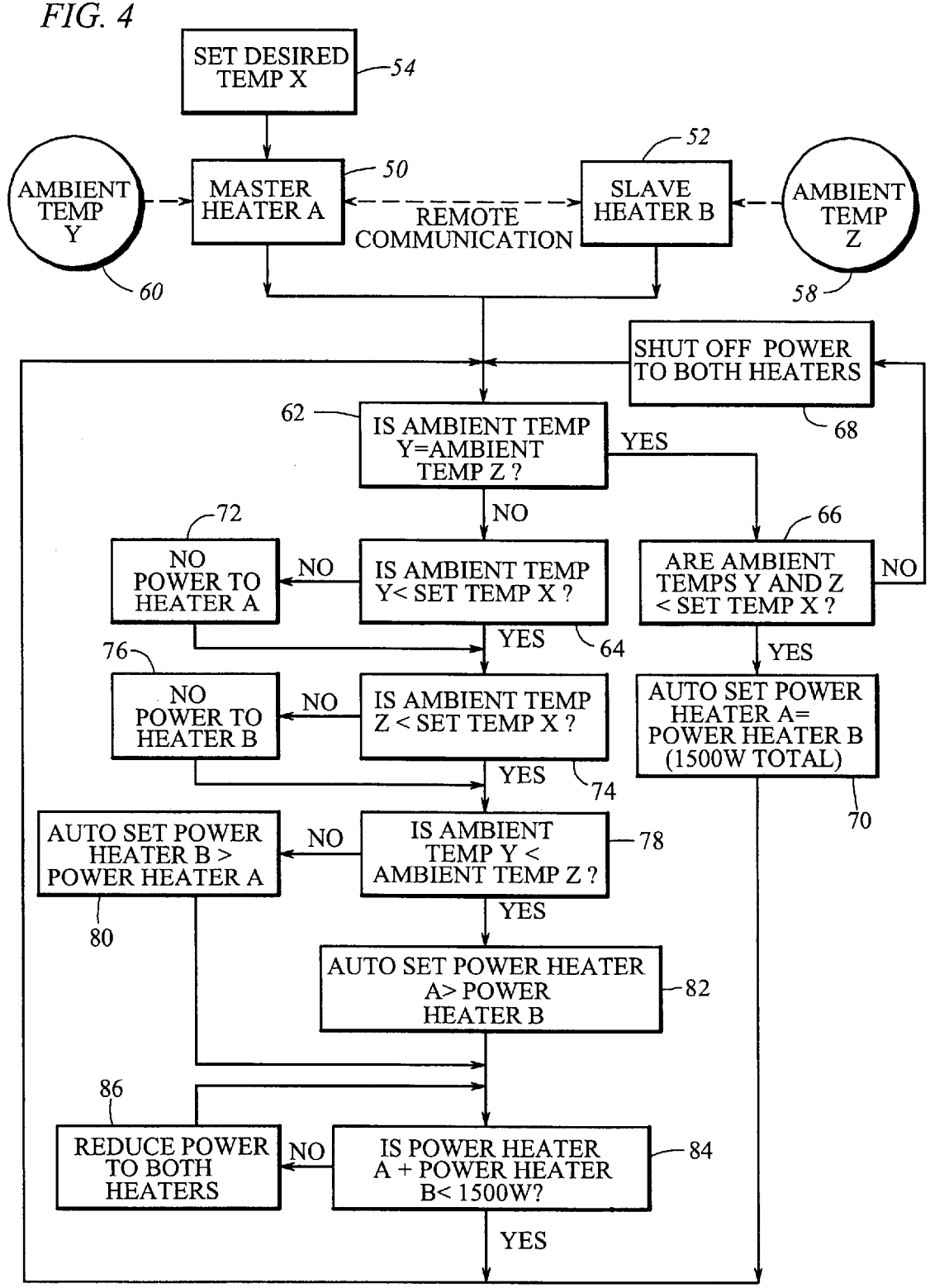
FIG. 4 diagrammatically illustrates control logic for the invention.

Referring now to FIG. 4, there is diagramatically illustrated the logic for the control of the present invention. As noted previously, the discrete space requires a plurality of units to uniformly condition the air; one of the units is designated as a master unit 50 and the other of the units is designated as a slave unit 52. The desired temperature in the discrete space is set at point 54. The ambient temperature immediately adjacent master unit 50 is sensed at step 60 (ambient temperature Y). The ambient temperature (Z) is also sensed at step 58 with respect to the area immediately adjacent slave unit 52. At the next step 62 of the control logic, the control determines if the ambient temperature at the master unit 50 is equal to the ambient temperature at the slave unit 52. If the answer to the logic question is "yes," then the next step is determining at point 66 whether the ambient temperatures at locations 58 and 60 are less than the set point temperature at location 54. If the answer is "no"(the ambient temperatures are higher than the set point temperature), then power to both heaters is terminated at step 68. However, if the answer to the question is "yes," then an equal amount of electrical energy is provided to both the master heater and the slave heater at step 70, with a total of 1500 watts being the limitation on the total power delivered from both heaters.

Returning to logic step 62, if the ambient temperature at point 60 is less than the ambient temperature at point 58, then the next step is to determine whether the ambient temperature at point 60 is less than the set point temperature. In the event ambient temperature at point 60 is greater than the set point temperature, then at step 72 power is discontinued to the master unit 50.

However, if ambient temperature at point 60 is less than the set point temperature at point 54, then the next step in the control process is started. At step 74, the ambient temperature established at point 58 is noted and if the ambient temperature at point 58 is greater than the set point temperature at point 54, the slave unit 52 is turned off at step 76. However, if the ambient temperature at point 58 is less than the set point temperature, then the process is continued.

At step 78, the ambient temperature at point 60 is noted and compared to the ambient temperature at point 58. If the ambient temperature at point 60 is greater than the ambient temperature at point 58 then the electrical energy to slave unit 52 is increased and the electrical energy to master unit 50 is decreased. However, if the ambient temperature at point 60 is less than the ambient temperature at point 58, then the electrical energy to master unit 50 is increased and the electrical energy to slave unit 52 is decreased. This step is diagramatically shown at location 82 in FIG. 4.

Finally, at step 84, the power at both units 50, 52 is noted. If the power at both units is greater than 1500 watts combined, then the electrical energy delivered to each of the units is reduced. However, if the total power delivered at both of the units 50 and 52 is equal to or less than 1500 watts then a power reduction at each of the units is not required.

In addition to the benefits previously described, it has also been determined that the present system reduces the temperature gradient from the floor to the ceiling of a discrete space. Employing multiple units in the discrete space results in improved mixing of the air from the ceiling to the floor.

While the heaters are shown as communicating through IR transmitters/receivers, the heaters may also communicate via a standard 120-volt wiring system or via a small hardwired signal lead. Further, while two heaters are shown in the preferred embodiment, additional remote heaters may be added to control the temperature in a much larger room or even in multiple rooms.

While a preferred embodiment of the present invention has been described and illustrated, the invention should not be limited thereto but may be otherwise embodied within the scope of the following claims.

What is claimed is:

1. An electric heating system for a discrete space comprising:
   a plurality of electric heaters, each of said heaters having an independent electric power supply cord for connection to a source of electrical power;
   one of said heaters including a master control and another of said heaters including a slave control, said master control including a temperature control for enabling a user to establish a desired set point temperature within the discrete space, each of the heaters including a thermostat for sensing the ambient temperature in the area of the discrete space immediately adjacent the respective heater; and
   communication devices associated with each of said heaters for enabling the master control on said one heater to simultaneously control the heating operation of each of said heaters, said communication device transmitting a signal from said slave control to said master control, said signal being indicative of the ambient temperature sensed by the thermostat on the said another of said heaters, said communication device transmitting a signal from said thermostat of said one heater to said master control indicative of the ambient temperature sensed by the thermostat on the said one heater, said master control generating an output signal, said communication device receiving said output signal and transmitting second and third output signals to the said one heater and the said another heater to simultaneously vary the heat output of each heater in inverse proportion to the sensed ambient temperatures to substantially uniformly heat said discrete space.

2. An electric heating system in accordance with claim 1 wherein said system includes more than one heater having a slave control provided thereon.

3. A heating system in accordance with claim 2 wherein said communication device comprises an infrared (IR) signal transmitter/receiver.

4. A heating system in accordance with claim 3 wherein said plurality of electric heaters are connected to the same electrical circuit and said master control and said slave control cooperate to limit the total electrical power at all of said heaters to not more than 1500 watts.

5. A heating system in accordance with claim 1 wherein said communication device comprises an IR signal transmitter/receiver.

6. A heating system in accordance with claim 1 wherein said plurality of electric heaters are connected to the same electrical circuit and said master control and said slave control cooperate to limit the total electrical power at all of said heaters to not more than 1500 watts.

7. A method of uniformly heating a discrete space using at least two electrically powered heaters comprising the steps of:
   affixing a master controller to one of said heaters;
   sensing the temperature of the ambient air immediately adjacent each of said heaters;
   transmitting a first control signal from the other of said heaters to said master controller indicative of the sensed ambient temperature immediately adjacent the other of said heaters;
   transmitting a second control signal from the one said heater to the master controller indicative of the sensed ambient temperature immediately adjacent the one heater; and
   transmitting a heater control signal from said master controller to said one and said other heaters to simultaneously vary the output of each heater in inverse proportion to the sensed ambient temperatures to substantially uniformly heat said discrete space.

8. A method of uniformly heating a discrete space in accordance with claim 7 further including the step of limiting the total electrical power at all of said heaters to not more than 1500 watts.

9. A system for supplying conditioned air into a discrete space for obtaining a desired set point temperature within the space comprising:
   a plurality of units for providing conditioned air into said space, each of said units having an independent power supply cord for connection to a source of electrical power; one of said units including a master control and another of said units including a slave control, said master control including a temperature control for enabling a user to establish the desired set point temperature within the discrete space, each of the units including a thermostat for sensing the ambient temperature in the area of the discrete space immediately adjacent the respective unit; and
   communication devices associated with each of said units for enabling the master control on said one unit to simultaneously control the operation of each of said units, said communication device transmitting a signal from said slave control to said master control, said signal being indicative of the ambient temperature sensed by the thermostat on the said another of said units, said communication device transmitting a signal from said thermostat of said one unit to said master control indicative of the ambient temperature sensed by the thermostat on the said one unit, said master control generating an output signal, said communication device receiving said output signal and transmitting second and third output signals to the said one unit and to the said another unit to simultaneously vary the operation of each of the units so that the temperature of the output air of each unit is in inverse proportion to the sensed ambient temperatures to substantially uniformly condition the temperature of the air in said discrete space to obtain said desired set point temperature.

10. A system for supplying conditioned air into a discrete space in accordance with claim 9 wherein said communication device comprises an IR signal transmitter/receiver.

11. A system for supplying conditioned air into a discrete space in accordance with claim 10 wherein said plurality of units are connected to the same electrical circuit and said master control and said slave control cooperate to limit the total electrical power at all of said units to not more than 1500 watts.

12. A system for supplying conditioned air into a discrete space in accordance with claim 9 wherein said plurality of units are connected to the same electrical circuit and said master control and said slave control limit the total electrical power at all of said units to not more than 1500 watts.

* * * * *